United States Patent Office 3,311,486
Patented Mar. 28, 1967

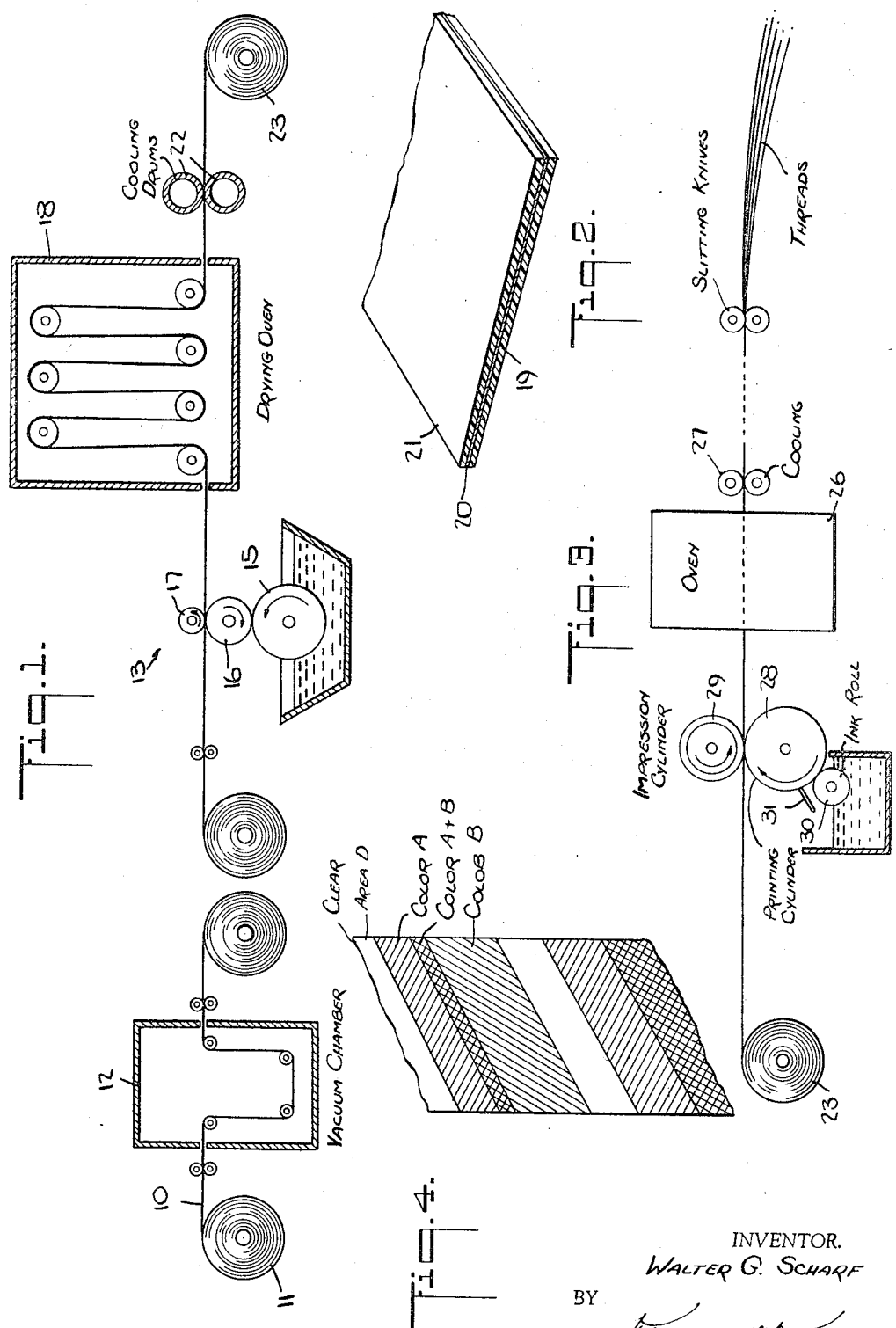

3,311,486
MULTI-COLORED METALLIZED THREADS
Walter G. Scharf, Ridgewood, N.J., assignor to Metal Film Company, Inc., New York, N.Y., a corporation of New York
Continuation of application Ser. No. 111,319, May 19, 1961. This application Oct. 28, 1963, Ser. No. 320,604
5 Claims. (Cl. 117—4)

This application is a continuation of my pending application Ser. No. 111,319, filed May 19, 1961 (now abandoned).

The present invention relates generally to synthetic textile yarns having a metallic appearance, and more particularly to a method of producing multi-color threads of this type.

The main object of the present invention is to provide multi-color synthetic non-laminated threads which, when woven in a conventional manner, produce decorative color effects heretofore obtainable only by complex weaving procedures or by laminated threads. Thus it becomes possible with threads in accordance with the invention to produce flecked, boucle and moiré effects as well as other unusual decorative effects arising from an apparent random scattering of bright metallic particles.

More specifically, it is an object of the invention to provide multi-color non-laminated metallized synthetic threads having brilliant coloration, the threads being of very fine size to produce silk-like fabrics.

In United States Patent 2,974,055, issued to applicant on Mar. 7, 1961, there is disclosed a non-laminated filamentary metallized thread which is produced by vacuum-plating a relatively broad web of thermoplastic material such as Mylar with a metal deposit such as aluminum, the metallized deposit being then coated with a transparent plastic in liquid form, which coating is then cured. The plastic-coated metallized web is slit to form filamentary threads. Such threads, being produced entirely without adhesive, cannot delaminate and have great tensile strength.

A significant advantage of the present invention is that it is possible to multi-color a non-laminated synthetic yarn of the above-described type without materially adding to its thickness.

Another important advantage of the invention is that it is possible to use brilliant dyestuff which, while not inherently light-fast, will nevertheless be so protectively applied to the material being colored as to remain relatively insensitive to light.

For a better understanding of the invention, as well as other objects and features thereof, reference is made to the following detailed description to be read in conjunction with the accompanying drawing, wherein:

FIG. 1 is a schematic diagram showing the first phase of a process in accordance with the invention;

FIG. 2 is a perspective view of the uncolored web produced by the first phase of the process;

FIG. 3 illustrates schematically both the second and third phases of the process; and FIG. 4 is a perspective view of the multi-colored web produced by the process.

As shown in FIG. 1, in the first phase of a process in accordance with the invention for producing a metallized thread, a continuous web of transparent thermoplastic material 10 is drawn from a supply roll 11 and is caused to travel through a high-vacuum chamber 12 in which one surface of the film is metallized. The web may be constituted by cellophane, acetate, tri-acetate, acetate butyrate, polymerized ethylene glycol terephthalate (Mylar), or any other suitable transparent and flexible material capable of being vacuum-plated. The thickness of the web for ordinary yarn should not exceed 2 mils, but of course other thicknesses may be used in other applications.

In the vacuum chamber, one surface of the film is metal-plated by gold, silver, aluminum, magnesium, titanium, nickel or any other metal, the thickness of the metal layer preferably not exceeding $\frac{1}{50,000}$ of an inch. The deposition may be carried out by known thermal evaporation or cathodic sputtering techniques. In thermal evaporation, metal vapor is generated by direct heat such as an electric arc source or a glowing filament. To effect maximum adherence of the plated film, the metal atoms should pass linearly from their source to the surface to be coated, and this requires the maintenance of pressures of about $10^{-4}$ of mercury in the vacuum chamber. In cathode sputtering, a high voltage is impressed between an anode and a cathode of the plating metal. The cathode is vaporized by positive-ion bombardment, some of the vapor diffusing away from the cathode and depositing on the web to be plated. The voltage requirements depend on the nature of the cathode metal. At pressures of 0.01 to 0.10 mm. of mercury necessary to maintain the glow discharge, the ordinary laws of diffusion prevail. After plating, the web is re-rolled in preparation for the next step.

To produce a yarn having the color properties of the metal deposit, the metallized web is then uniformly coated on the metal side with a transparent plastic in solution or suspension which is related structurally to and has an affinity for the web which is metallized. That is to say, the plastic coating must have substantially the same tensile strength and elongation characteristics as the web material. This uniform coating can be applied by a roller coater, a reverse roller coater, or by the flexographic or rotogravure process. By way of illustration, FIG. 1 shows a direct three-roll coater. The coater, generally designated by numeral 13, includes a bath 14 for containing the liquid, a first roller 15 which is rotatable within the bath and acts to apply the liquid to a second roller 16 which engages the metallized surface of the web 10, the web being pressed against the second roller by means of a third roller 17.

The wet plastic coating formed on the web 10 is then dried and cured by passing the web through an oven 18 which is properly heated and vented to drive off all solvents and at the same time to effect the curing of the coated material. For heating purposes, steam, gas heat or infra-red radiation may be employed, as desired. The temperature of the oven and the travel time therethrough are determined by the specific web and coating materials. The coating is further cured by cooling drums 22 disposed at the opposite end of the oven. Cooling may be accomplished by a circulating water system or a refrigerant. The web is then rolled on roll 23.

As pointed out previously, it is important that the plastic coating on the metallized web be related structurally to and have an affinity for the web material. Where the web material is constituted by Mylar, it has been found that an effective coating is one in which the basic make-up of the solids is approximately as follows, on a ratio basis per weight:

| | Parts |
|---|---|
| Vinylite VAGH | 1 |
| Vinylite VMCH | 1 |
| Nitrile rubber | 1 |
| Ultra-violet light absorber | .12 |

The ratio basis of the above constituents may be varied without materially impairing the efficacy of the mixture, by reducing the Vinylite VAGH to an extent not exceeding about 30%, and by increasing the Vinylite VMCH to an extent not exceeding about 30%. Alternatively, the Vinylite VAGH may be increased by 30% and the Vinylite VMCH decreased by 30%. However, the Nitrile Rubber should be held more or less constant, as well as the ultra-violet light absorber.

The light absorber acts as an anti-oxidant relative to the rubber and in lesser amounts than above indicated, is not fully effective. On the other hand, an increased amount would not significantly improve the ultra-violet light resistance of the dried film laid down with the coating composition. The light absorber prevents discoloration of the film.

The Nitrile Rubber is available commercially from several sources. The Nitrile content may run between 30% to 36% and the balance made up of butadiene. This type of rubber is higher in acrylonitrile content, giving a harder polymer, which is necessary to add to the compositions for a non-blocking coating and one that will resist boiling of the coating when the coated material is formed into metallic yarn and subjected to various dye and cleaning processes, etc.

The Vinylite VMCH is manufactured by Bakelite Corp., under their trade name, the chemical composition being as follows:

| | Percent |
|---|---|
| Vinyl chloride | 86 |
| Vinyl acetate | 13 |
| Inner polymerized di-basic acid | 1 |

Vinylite VAGH is also manufactured by Bakelite Corp., the chemical constituents being the following:

| | Percent |
|---|---|
| Vinyl chloride | 91 |
| Vinyl acetate | 3 |
| Organic material having hydroxyl group (2.6 times greater when calculated as vinyl alcohol) | 6 |

The function of the Vinylite VMCH is to effect adherence to metallic surfaces and also to plain polyester surfaces. The Vinylite VAGH gives better range for hardness and over-all compatibility which allows the introduction of a wider range of colors.

The Vinylite VMCH does not tolerate the addition of many pigments or dyes, and resort is therefore had to VAGH for broader compatibility of colors to be added, as well as to good adhesion, along with a material that is hard, thereby imparting a non-blocking character to the coating film itself. Various types of light-fast Azo dyes, vat dyes and various types of pigment dispersions are compatible in this mixture.

This mixture may be dissolved in a straight ketone system, such as acetone of M.E.K., where high volatility and evaporation of solvents is desired. For general coating operations on reverse roll coaters, the solvent system may be two-thirds methyl ethyl ketone and one-third aromatic hydrocarbon, such as toluol solvent. The solids may range between 18% to 23% for a low viscosity mixture.

A metallized thread formed in accordance with the above-described process and including a Mylar base or web will afford increased yardage per pound of Mylar as compared with conventional laminated thread structures, since only one ply of Mylar is entailed. And since no adhesive is employed, the plastic coating being integrally bonded to the web, the thread cannot delaminate. Thus, as shown in FIG. 2, the metallized web prior to slitting is constituted by a thermoplastic strip 19, a thin metal coating 20 deposited thereon, and a plastic film 21 intimately bonded to the surface of metal deposit 20 to form an integral structure.

Referring now to FIG. 3, in phase 2 of the process the uncolored metallized web is drawn from roll 23 and conveyed through a rotogravure press 24, where the plastic-coated side is printed by cylinders with color bands or stripes to be later described, the printing ink being of the same composition as the plastic liquid used in bath 14 in phase 1, but having dyestuff or pigment added thereto. This printing ink is contained in a suitable fountain 25. The ink so applied is cured in drying oven 26, and cooled by rollers 27 very much in the manner of the plastic coating described in connection with phase 1.

Gravure printing is a well-known process in which the image areas of the printing surface are recessed. The surface is first covered with ink and the excess is wiped off, leaving ink only for the recessed image, the image being transferred by pressure to the surface being printed.

The gravure printing unit comprises a printing cylinder 28, an impression cylinder 29, and an inking system including ink fountain 25 whose ink is applied to the printing cylinder by an ink roll 30. The excess is removed by a doctor blade 31 and returned to the fountain. The impression cylinders are covered with a resilient rubber composition that presses the web surface in contact with the ink in the tiny cells of the printing surface. The drawing, for simplicity, shows only a single gravure unit for a single color. In multi-color printing, two or more units operate in tandem and each color must be dried before the next is printed. The web therefore is passed through a heated oven after each impression. The rotogravure process disclosed herein is entirely conventional, and any standard equipment may be used for this purpose.

What is significant is that, in lieu of conventional printing inks, a liquid plastic of the type disclosed in connection with FIG. 1, is employed and is colored by the use of pigments or dyes soluble therein. When cured, this ink forms a colored plastic film which adheres to the clear film covering the metal deposit on the base web. Preferably dyestuff is used, such as Acetosol dyes manufactured by the Sandoz Company, or Orasol made by Ciba, or Grasol, made by Geigy. The invention makes possible the use of such nonlight-fast dyes, inasmuch as these dyes are dissolved in the plastic solution which, as pointed out previously, is resistant to ultra-violet light and acts as a protective filter therefor. Thus, despite the nonlight-fast character of the dye, its dispersion within the plastic solution greatly reduces the sensitivity of the dye to light. The advantages of such dyes, as against light-fast dyes, is that they are more brilliant in color and easier to handle. Another advantage of dye over pigment is that the latter is composed of solid particles which form a suspension in the plastic solution and tend to make the printed coating thicker and less flexible. This is not desirable, since the yarn is preferably very thin and light.

In order to provide random color effects, rather than uniform patterns, the rotogravure cylinders are provided with uneven bands or stripes of printing surface which are askew relative to the cylinder axis. The printing is carried out so that, as shown in FIG. 4, a first color band A is laid down repetitively along the web being printed, and a second color band B is laid down to overlap partially or fall over the first band to produce an intermediate band C composed of A and B, in combination. Areas of the web remain unprinted and in the case of aluminized webs, these will have a silvery appearance providing in effect still another color. There is, of course, no limit to the number of colors which can be laid down by the rotogravure process.

In phase 2 of the process, the printing as above described, is carried out on the film side of the web, while in phase 3 the same operation is carried out on the Mylar side, but the colors there are displaced from that on the other side, further enhancing the random coloration. The colored portions may be opaque or partially transparent or translucent to vary the color effects. The web, after being completely colored, is slit by knives 32 into threads of the desired width. The thread will present clearly delineated areas of different color which may be sharply contrasted. The threads may then be woven into fabric patterns either as warp or filler, and they may be woven flat or twisted, as desired. When woven into a solid-color ground, the threads provide intermittently visible specks of color in different tones to produce a fabric which literally glitters.

It is, of course, not necessary that the web be printed with bars, stripes or bands of color, and other geometric forms may be used. Nor need the bands be of uniform tone, for graduated shadings may be employed to further vary the coloration.

In summary, in a process according to the invention, four layers are formed, the first layer being the flexible thermoplastic web, the second being the metal deposit thereon, the third being the transparent film covering the metal deposit, and adhering directly thereto, the fourth being the discrete areas of color formed of the same material as the film and adhering directly thereto. Thus in those areas of the third layer which are not covered, the color of the metal deposit is exposed through the transparent film, so that the original metallic color is combined with the color effect generated by the fourth layer areas.

It is important to note that the third and fourth layers overlying the second layer (metal deposit) are of a material structurally related to the first layer. Hence when the multi-layer web is slit into yarn and the yarn is subjected to stretching forces, as would be the case in fabrics woven thereof, since the structurally related layers have substantially the same elongation characteristics, no rupture of any one layer will occur before that of another, and the integrity of the yarn is maintained.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. The method of producing multi-colored yarns, comprising the steps of depositing on a transparent thermoplastic web constituting a first layer, a metallic coating forming a second layer thereon, coating said second layer with a transparent synthetic plastic in liquid form of a material related structurally to said first layer to form a third layer thereon, drying and curing said third layer to form a non-tacky film adhering directly to said second layer, printing on said third layer discrete areas of different color with an ink formed of the same liquid plastic as said third layer but having a color agent dissolved therein, drying and curing said ink areas to form non-tacky areas adhering directly to said third layer and constituting a fourth layer thereon, the metallic color of said second layer being exposed through said third layer in those portions thereof not covered by said fourth layer, and slitting the four-layer web into multi-colored yarns.

2. The method as set forth in claim 1, wherein said web is constituted by a material chosen from the class consisting of regenerated cellulose, cellulose acetate, cellulose triacetate and cellulose acetate butyrate.

3. The method as set forth in claim 1, wherein said web is formed of polymerized ethylene glycol terephthalate.

4. The method as set forth in claim 1, wherein said metallic layer is formed by vacuum-plating said web.

5. The method as set forth in claim 1, wherein said discrete areas of color in said fourth layer overlap each other.

References Cited by the Examiner
UNITED STATES PATENTS

| | | | |
|---|---|---|---|
| 2,921,517 | 1/1960 | Disch | 117—38 X |
| 2,974,055 | 3/1961 | Scharf | 117—4 |
| 3,244,544 | 4/1966 | Scharf | 117—4 |

WILLIAM D. MARTIN, *Primary Examiner.*

H. W. MYLIUS, M. LUSIGNAN, *Assistant Examiners.*